(No Model.)
G. W. BAKER.
FRICTION CLUTCH.
No. 285,725. Patented Sept. 25, 1883.
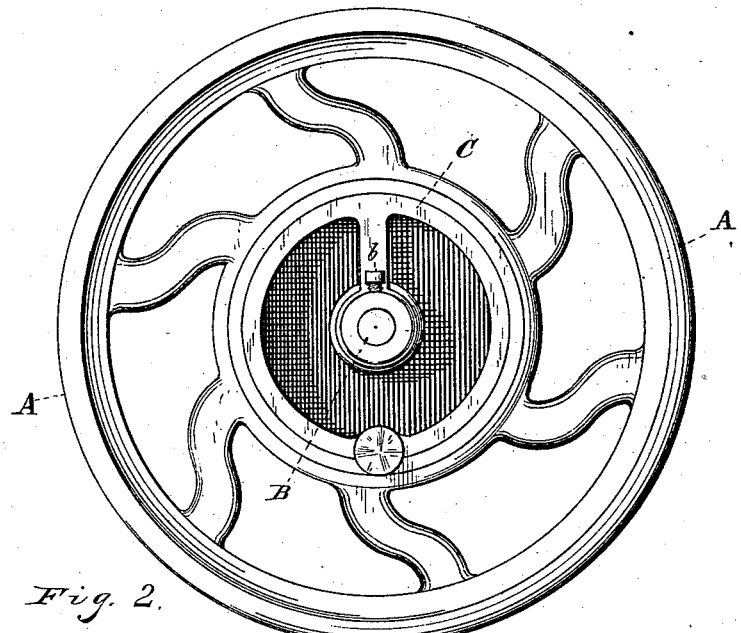
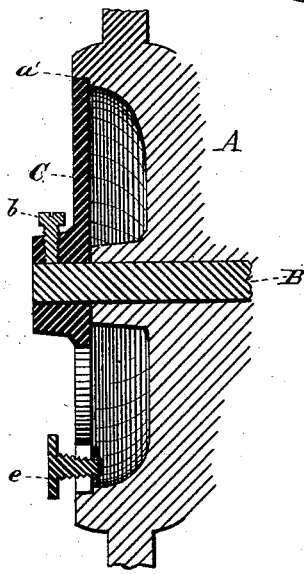
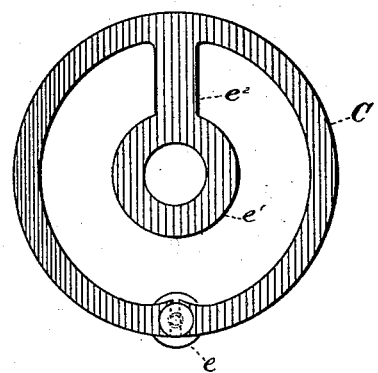
WITNESSES
INVENTOR
ATTORNEYS

UNITED STATES PATENT OFFICE.

GEORGE W. BAKER, OF CLEVELAND, OHIO, ASSIGNOR TO THE WHITE SEWING MACHINE COMPANY, OF SAME PLACE.

FRICTION-CLUTCH.

SPECIFICATION forming part of Letters Patent No. 285,725, dated September 25, 1883.

Application filed May 3, 1883. (No model.)

*To all whom it may concern:*

Be it known that I, GEORGE W. BAKER, of Cleveland, in the county of Cuyahoga and State of Ohio, have invented certain new and useful Improvements in Friction-Clutches; and I do hereby declare the following to be a full, clear, and exact description of the invention, such as will enable others skilled in the art to which it pertains to make and use the same.

My invention relates to improvements in friction-clutches, and more especially to that class of friction-clutches that are used on light machinery—such as sewing-machines; and it consists of certain features of construction and combination of parts, hereinafter described, and pointed out in the claim.

In the drawings, Figure 1 is a side elevation of a fly-wheel to a sewing-machine with my new-devised clutch attached. Fig. 2 is a sectional view of the fly-wheel, clutch, and a driving-shaft. Fig. 3 is a detailed side view of the clutch.

A represents the fly-wheel, B the driving-shaft, C the clutch, and $e$ a thumb-screw with a tapering screw end for expanding the rim of clutch.

The clutch C consists of a rim, a hub, $e'$, and a single arm, $e^2$, connecting the rim with the hub. The rim of the clutch is severed on the side opposite the said arm, and has at this point a hole provided with a thread suitable for receiving the end of the thumb-screw $e$. The hub $e'$ is fitted to the shaft B, and held firm in its position on the shaft by the set-screw $b$. The periphery of the rim of the clutch is fitted to a recess in the wheel A, as shown at $a'$, but is made of a diameter that is a fraction smaller than the diameter of the said recess.

The operation of my device is as follows: When the thumb-screw $e$ is screwed into the hole in the side of the rim of the clutch, it forces apart the severed ends of the rim, and causes the rim to expand in such a manner as to engage the periphery of the recess in the wheel A, thereby causing the said wheel, clutch, and shaft to revolve together. By loosening the thumb-screw $e$ the rim of the clutch will by its own elasticity regain its former position, thereby leaving the wheel A free to revolve on the shaft without turning the shaft or clutch.

What I claim is—

The combination, with a wheel or pulley having a recess formed in one side thereof, of a friction-clutch constructed with a hub, a single spoke or arm, an elastic rim severed at a point opposite the arm or spoke, the severed ends being provided with screw-threads, and a tapering screw for expanding the rim of the clutch, substantially as set forth.

In testimony whereof I sign this specification, in the presence of two witnesses, this 27th day of April, 1883.

GEORGE W. BAKER.

Witnesses:
 C. H. DORER,
 ALBERT E. LYNCH.